Dec. 7, 1965    J. B. ORR    3,222,515

ROOM LIGHT CONTROL

Filed Jan. 3, 1963    2 Sheets-Sheet 1

INVENTOR.
JOHN B. ORR
BY
Green, McCallister & Miller
HIS ATTORNEYS

Dec. 7, 1965 J. B. ORR 3,222,515
ROOM LIGHT CONTROL
Filed Jan. 3, 1963 2 Sheets-Sheet 2
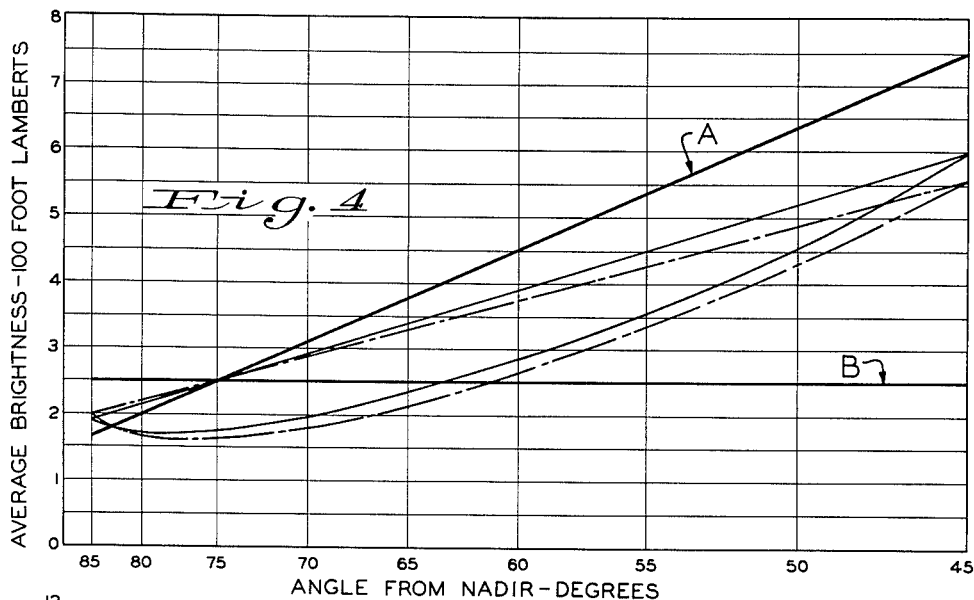
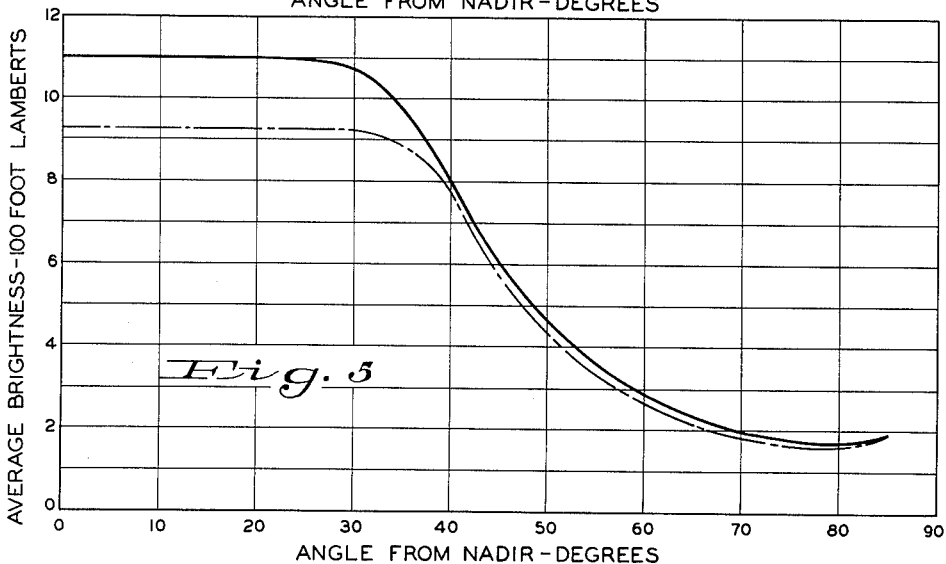
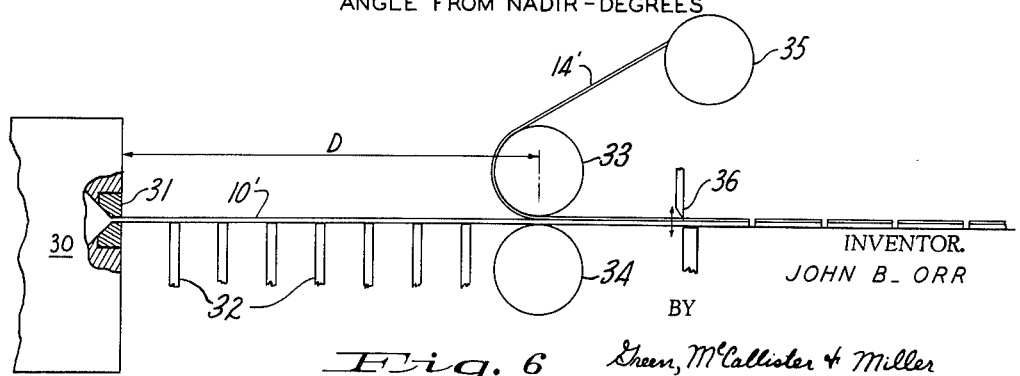
INVENTOR.
JOHN B. ORR
BY Green, M°Callister + Miller
HIS ATTORNEYS

United States Patent Office 3,222,515
Patented Dec. 7, 1965

3,222,515
ROOM LIGHT CONTROL
John B. Orr, Great Barrington, Mass., assignor to Sheffield Plastics, Inc., Sheffield, Mass., a corporation of Massachusetts
Filed Jan. 3, 1963, Ser. No. 249,210
5 Claims. (Cl. 240—106)

This invention relates to improved procedure and apparatus for controlling the dispersion of light from a localized source such as a fluorescent tube.

More particularly, this invention is directed to a new article of manufacture consisting of a prismatic light control panel that has improved light refraction, reflection, and absorption properties, and thereby achieves improved lighting quality at high light outputs. This invention also relates to a method of controlling the dispersion of light which employs the use of such panel as well as procedure and apparatus for manufacturing the panel.

The effectiveness of room lighting involves several somewhat independent considerations. First, the light quantity or brightness available for lighting a particular task must be determined by the use of standards such as the tables of recommended foot-candles provided by the Illuminating Engineers Society. The quantity of light is controlled basically by proper selection of the lighting source and accordingly, the only limit upon such selection is the availability of high wattage lamps and the electricity necessary to power the lamps.

A second consideration in lighting effectiveness relates to sources of eye strain and distraction most commonly caused by insufficient background lighting, and direct glare. Background lighting, of course, can be controlled easily by proper placement of lighting fixtures. However, direct glare can be controlled only by modifying the average brightness of the emitted light that is likely to be directly incident upon the eyes of room occupants.

Commonly, the modification of light brightness, to control or avoid direct glare, is accomplished by light control means, such as grids, prisms or various light diffusers placed between the source and the space being illuminated. Partially as a result of the increased use of high output lamps in schools and offices, the Illuminating Engineers Society has established a method of determining whether a lighting fixture or luminaire, that is otherwise suited to a particular job, will satisfactorily avoid the production of undesirable direct glare. Generally speaking, this method defines limits for average brightness emerging from a luminaire at angles between 45 and 85 degrees from the nadir.

Of course, the efficiency of the control means in modifying light at glare-causing-angles without unduly affecting light at task-lighting-angles is of the utmost importance with respect to the cost of operating a particular lighting system. Furthermore, in installations requiring very bright direct light, only a highly efficient light control mechanism can satisfy the criteria established by the Illuminating Engineers Society.

Clear-resin plastics have been found to be desirable as the base material for light control panels employed in conjunction with ceiling mounted fluorescent lighting fixtures for many reasons. Clear-resin panels are relatively easy and inexpensive to manufacture as the clear resin materials employed are comparatively inexpensive in themselves, and can easily be formed by extrusion or pressure molding, into various attractive shapes. Furthermore, it is relatively easy to emboss a prismatic surface into such panels which will theoretically control the emitted light as required by the specifications of the Illuminating Engineers Society. In practice, however, practical manufacturing tolerances prevent such a prismatic surface from operating with a sufficient efficiency to even approach the desired specifications.

A clear-resin plastic light control panel that includes a substantially uniform dispersion of near-microscopic light absorbing particles has been developed. The light control provided by a prismatic clear-resin panel containing carbon black is highly efficient in modifying the light emitted at glare-causing-angles to achieve compliance with the Illuminating Engineers Society specifications without unduly reducing the direct task light. However, I have found that the overall quality of lighting provided by a prismatic plastic panel can be further improved by the addition of means for reflecting a greater percentage of the light emitted at glare-causing-angles (45 to 85°) and reflecting a lesser percentage of the remaining light which is primarily within the task-lighting-angles of 0 to 30°.

Accordingly, an object of my invention has been to fully investigate the problems of lighting effectiveness and to provide an improved solution to these problems;

Another object of my invention has been to provide a clear-resin plastic light control panel that emits light of an overall high quality by maximizing the light emitted between 0 and 30° from the nadir, while limiting the direct glare-causing light as required by the specifications of the Illuminating Engineers Society;

Another important object of my invention has been to provide a prismatic, clear-resin light control panel that is easy to fabricate and that can be readily employed in lighting fixtures designed to receive existing light control panels;

A further important object of my invention has been to devise a procedure for manufacturing prismatic clear plastic light control panels that insures the production of panels having a uniform high light control efficiency;

These and other important objects of my invention will appear to those skilled in the art upon reading and understanding the following description of my invention and a specific embodiment thereof.

Light absorbing means has been provided in light control panels to absorb a substantial portion of the light that is reflected internally within the panel. Since internally reflected light approaches the prismatic surface of the panel from random directions, it cannot be adequately refraction-controlled by proper design of the prismatic surface. Accordingly, absorption of such internally reflected light greatly improves the control efficiency of the panel.

I have found that the light emitted from a typical prismatic surface within the annoying glare range (45° to 85°) initially strikes the light control panel at relatively high angles, and that light incident upon the light control panel at low angles will be emitted from the prismatic surface primarily in the "task-lighting" range (0 to 30°). Accordingly, I have devised a material to be added to the upper or light-receiving surface of a prismatic light control panel that will reflect a greater percentage of the light incident upon it at high angles than light incident upon it at low angles. The reflecting material employed in my invention consists of a thin (2 mil) film of commercially available, expanded and extruded polystyrene that characteristically includes a multitude of extrusion flattened and aligned, air spaces or bubbles therein. Each of the flat bubbles provides a pair of minute reflecting surfaces that will pass a high percentage of the light incident at high angles thereto and reflect a high percentage of the light incident at low angles.

The expanded polystyrene reflecting material can conveniently be laminated or surface welded directly to the upper planar surface of the clear plastic light control panel. It will thus be seen that light from a source, such as a fluorescent tube, will be selectively eliminated prior to its entrance into the prismatic panel itself, depending on the initial angle of incidence of the light with respect to the reflecting material.

While I prefer to employ the reflecting material in conjunction with panels having an absorption medium therein, it will be appreciated by those skilled in the art that my reflecting material can be advantageously employed even with unmodified prismatic panels.

I have found that in the manufacture of light control panels in accordance with my invention, the expanded polystyrene film must be maintained below 200° F. during the laminating process. When the temperature is increased above 200° F. the flattened aligned bubbles shrink and become unaligned and thus the selective reflecting characteristic of the expanded polystyrene is destroyed.

Polystyrene sheet, such as employed to make up the body of my light control panel, issues from the extrusion die at a temperature of about 350° F. Although the usual practice when laminating plastic sheets for various purposes, is to join or roll together the sheets immediately upon their issuance from an extrusion die, I have found that such usual practice destroys the effectiveness of my oriented bubble polystyrene film. I have discovered, however, that the expanded polystyrene film can readily be laminated to the thicker sheet of extruded polystyrene, if the thicker sheet is permitted to cool to about 250° F. before the laminating operation is commenced. It is necessary, however, to increase the pressure between the laminating rolls to 1000 pounds per foot length of rolls and to maintain the temperatures of the rolls at about 140° F. in order to preserve the flattened bubbles within the expanded polystyrene film. Conveniently, the same rolls that laminate the film to the extruded panel can be employed to emboss the prismatic surface of the panel.

Although different apparatus can be employed to perform the laminating process, I prefer to employ a continuously operating mechanism including laminating rolls that are spaced from the extrusion outlet of the thick sheet forming apparatus a sufficient distance to automatically permit cooling of the thicker sheet from its initial temperatures of 350° F. to the desired laminating temperature of 250° F.

My invention described generally above will be more fully understood from the following description of a specific embodiment, wherein reference is made to the accompanying drawings, of which:

FIGURE 4 is a graphic illustration of the Illuminating Engineers Society glare control criteria, the lighting curve of a control panel that employs light-absorbing particles, and the light curve of a panel construction in accordance with my invention;

FIGURE 5 is a graphic illustration of the overall control effectiveness of a light control panel constructed in accordance with my invention; and FIGURE 6 is an operational layout view of a machine for laminating an expanded polystyrene film to a hot sheet of extruded clear plastic.

Figure 1:
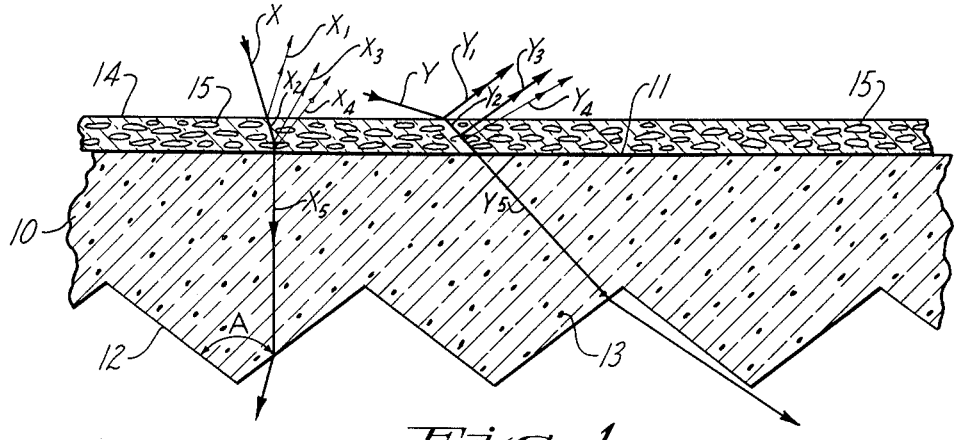
FIGURE 1 is a greatly enlarged, fragmental cross-sectional view of an improved light control panel constructed in accordance with my invention.

Turning now more specifically to FIGURE 1, there is shown a selective brightness modifier lens or light control panel 10 of any clear light-transmitting substance, but preferably of a clear polystyrene or acrylic resin or plastic. The panel 10 is provided with a planar, upwardly-facing, light-receiving major surface 11 and a downwardly-facing, light-refracting and emitting prismatic major surface 12 that is chosen in accordance with known design principles to redistribute light passing through the panel to thereby more nearly meet the requirements of satisfactory room light distribution. Preferably, prism angles A of the surface 12 are 112° as I have found a complementary cooperation between prismatic surfaces having such angles and the selectance reflecting material employed in my invention.

The panel 10 preferably contains a substantially uniform dispersion or mixture of light-absorbing particles 13, such as carbon black. The particles 13 remove a substantial percentage of the light that does not pass directly through the panel 10 but is internally reflected one or more times. The internally reflected light is substantially uncontrollable by the prismatic surface 12 and accordingly its elimination greatly improves the accuracy of the prismatic surface in redistributing the light.

The panel 10 of my invention has a selective reflecting thin layer, strata, film-like member or sheet 14 of expanded clear polystyrene film laminated or otherwise securely connected to its upper surface 11, whereby all light passing through the panel 10 must first pass through the sheet 14. The expanded polystyrene sheet 14 contains a multitude of spaced-apart flattened or elongated bubbles, air spaces or voids 15, the surfaces of which selectively reflect a large percentage of light from the light source at high angles and reflect a lesser percentage of the light incident from the light source at low angles. It will be noted that the air-bubble-containing portions 15 are flattened or elongated in a direction or lie generally parallel to the opposed major surfaces of the panel 10 and of the sheet or relatively thin film-like member 14.

The selective characteristic of the sheet 14 is somewhat diagrammatically illustrated by light rays X and Y. Light ray X is incident from a light source at a relatively low angle with respect to the vertical. As ray X enters the polystyrene sheet 14 there is a small component of reflection $X_1$, but the major portion of the ray $X_2$ continues into the polystyrene film. The portion $X_2$ will intersect one or more of the bubbles 15 and again there will be small components $X_3$ and $X_4$ of light reflected while the major portion $X_5$ of the light passes on into the panel 10 to be refracted by the prismatic surface 12. The light ray Y is incident at a high angle to the vertical upon the upper surface of the sheet 14. As it enters the polystyrene sheet 14 a comparatively large component $Y_1$ will be reflected and the remainder $Y_2$ of the ray will pass into the sheet. The remainder $Y_2$ will also strike one or more of the bubbles 15 and at each bubble surface a comparatively large component of light $Y_3$ and $Y_4$ will be reflected. A small component of light $Y_5$ will remain and enter the panel 10 to be refracted by the prismatic surface 11. It is thus seen that the selective action of the sheet 14 is based primarily on selective action of the bubbles 15 themselves.

Figure 2:
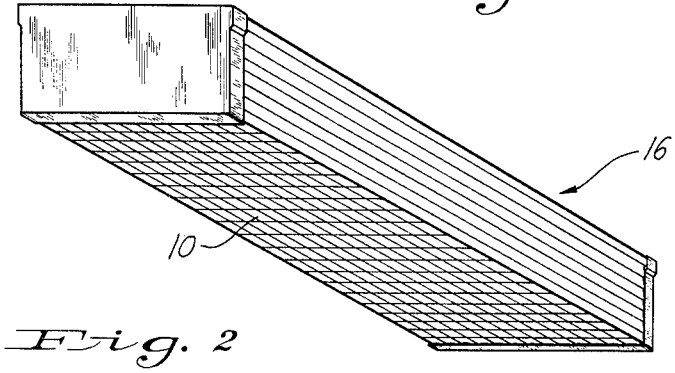
FIGURE 2 is a perspective view of a luminaire employing the light control panel of FIGURE 1.
Figure 3:
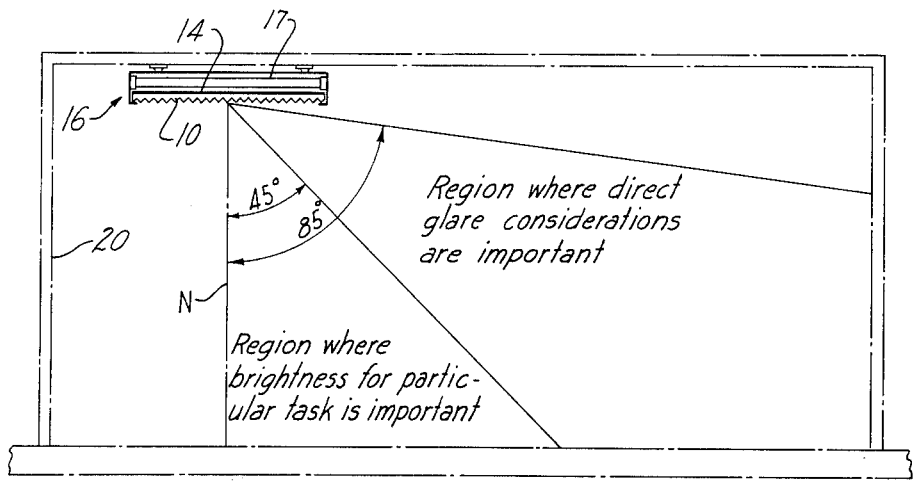
FIGURE 3 is a diagrammatic cross-sectional view of a room having a ceiling-located luminaire as shown in FIGURE 2, and illustrates the various angles of light emission that must be considered in determining the overall effectiveness of room light.

FIGURES 2 and 3 show a luminaire 16 employing a light control panel 10 that has a cross-section as shown in FIGURE 1. FIGURE 3 diagrammatically shows a room 20 having a ceiling-located light source such as a fluorescent tube 17 mounted within the lighting fixture or luminaire 16. The prismatic light control panel 10 including the expanded polystyrene sheet 14 that is laminated thereto, is positioned immediately beneath the light source 17. The ranges of light incidence angles referred to in the graphic illustrations of FIGURES 4 and 5 are shown diagrammatically in FIGURE 3. It will be apparent from FIGURE 3 that direct glare from the luminaire is a problem mainly from light rays emerging at angles between 45° and 85° to the nadir N. Light rays emerging at angles less than 45° and particularly between 0 and 30° to the nadir N provide the illumination of specific tasks and will not ordinarily directly enter the eyes of a room occupant.

The Society of Illuminating Engineers have established specifications or criteria for the light emitted in the 45° to 85° region. The specifications are graphically illustrated in FIGURE 4 as lines A and B. This graph is more commonly known to those skilled in the art as the "Scissors Curve." The "Scissors Curve" is utilized by plotting the average brightness of light emitted from a luminaire throughout the 45° to 85° region. If the curve thus plotted is entirely below any straight line drawn through the point 75°—250 ft.-lamberts and lying between lines A and B, the luminaire will not cause undue direct glare. It will be appreciated that the location of a curve and to some extent, its slope, will be dependent upon the brightness of light source with which the luminaire is tested. In FIGURE 4 there is also plotted a typical lighting curve (chain line) as produced by the light control panel that employs only light-absorbing particles and a typical lighting curve (solid line) as produced by a panel constructed in accordance with my invention. Both lighting curves have been adjusted to the point of marginal compliance with the requirements of the Illuminating Engineers Society. That is to say, if the brightness of the light source for which these curves were made, were increased slightly, both curves would move upwardly and it would no longer be possible to draw a straight line lying between the lines A and B, through the point 75°—250 ft.-lamberts which would be completely above the lighting curve.

FIGURE 5 graphically illustrates the overall lighting effectiveness of the light control panels whose responses are illustrated in FIGURE 4. As in FIGURE 4, the lighting curves shown in FIGURE 5 represent the maximum brightness light source that can be employed and still permit compliance with the Illuminating Engineers Society requirement. It will be seen that while both lighting curves are nearly identical between the angles of 40 to 85°, in the task-lighting 0–30° range, the solid line curve representing my invention emits approximately 180 ft.-lamberts more or almost 20% greater light than the chain line curve representing the control panel whose light curve is plotted in FIGURE 4. This difference is due to the selective reflectivity of the expanded polystyrene film that is employed in my invention, which reflects light at high angles of incidence and transmits a greater percentage of light at low incidence angles.

Turning now to FIGURE 6 which shows a diagrammatic operational layout of a machine for successfully laminating expanded polystyrene film to an extruded polystyrene or acrylic sheet, there is seen a sheet forming or extruding mechanism 30 including a die 31 from which issues a continuous extrusion formed clear plastic sheet 10′. A table 32, composed of a plurality of spaced localized supporting surfaces, receives and supports the extruded sheet 10′ as it issues from the machine 30. A pair of laminating presses or rolls 33 and 34 are located a distance D from the extrusion outlet of the machine 30 whereby the extruded sheet is permitted to cool from its extrusion temperature of about 350° F. to a satisfactory laminating temperature of about 250° F. The bottom press or roll 34 has a prismatic surface for embossing a light refracting surface onto the panel 10′ simultaneously with the lamination process.

Preformed expanded polystyrene film 14′ is delivered to the rolls 33 and 34 from a reel or spool 35, is fed in against the extruded sheet 10′, and is thereby laminated or welded intimately thereto by the compression of the rolls 33 and 34. The rolls 33 and 34 are forced together by a conventional means not shown to maintain a laminating force F therebetween of about 1000 lbs. per foot length of the rolls or a laminating pressure of about 170 lb. per square inch. I have found that by maintaining the rolls at a temperature of about 140° F. with the operational conditions maintained as indicated, the extruded sheets 10′ and the expanded polystyrene film 14′ pass through the laminating rolls 33 and 34, and are securely bonded together without disturbing the integral flattened-bubble configuration necessary to proper light control operation of the expanded film.

The thus formed laminated and embossed plastic sheet is then cut to size by suitable shearing means or blades 36 and is ready for use as a light control element.

While I have disclosed a machine that will satisfactorily carry out the process of laminating expanded polystyrene film to extruded clear plastic sheet, it will be appreciated by those skilled in the art that other apparatus may be employed without departing from the scope of my invention. For example, the extruded sheet material can be cut to size and stored in a soaking chamber until it is brought to the desired temperature of 250° F. Individual panels then can be passed through laminating rolls or fitted into laminating presses along with prepared sheets of expanded polystyrene film and the individual panel formed as desired. It will be appreciated, however, that the machine herein disclosed will operate on a mass production basis much more efficiently than other possible laminating methods.

From a reading and understanding of the foregoing disclosure, those skilled in the art will recognize that I have provided an improved light control panel constructed of transparent material such as clear plastic resin, that will provide a high quality light control for ceiling located light sources. The light control panel of my invention is easy to form and is composed of relatively inexpensive material. Its operation is not dependent upon highly accurate surface formation nor highly accurate location between the light source and light control element, but it will operate satisfactorily merely by location between the light source and the room being illuminated.

It will be appreciated that I have also provided a specific method for producing the light control panel of my invention, whereby the delicate nature of the reflecting material—expanded polystyrene film—is not destroyed or in any way disturbed by the laminating process required. The machine which I have provided for carrying out the process of my invention is simple to operate and control, whereby the continuous satisfactory production of light control panels is easily assured.

Having thus described my inventive concept and a specific embodiment thereof, I claim:

1. An article of manufacture which comprises, a relatively thin film-like member having a pair of opposed upper and lower major surfaces and whose upper surface is adapted to receive light from an overhead source and whose lower surface is adapted to transmit light therefrom, said film-like member having a body provided with a plurality of spaced-apart bubble-like portions therein that are flattened in a direction generally parallel to said opposed surfaces to selectively-reflect a large percentage of light from the light source of a high angular relation to the nadir and reflect a lesser percentage of light from the source of a lower angular relation to the nadir, a panel of light-transmitting material having a pair of opposed upper and lower major surfaces whose upper surface is positioned to receive light transmitted from the lower surface of said film-like member and whose lower surface is adapted to emit usable light therefrom, said panel having a body defining a lens for light transmitted from the source, said body having a substantial uniform dispersion of about microscopic-size light-absorbing particles therein having the characteristic of reflecting a greater percentage of light striking the upper surface of said panel at relatively high angles within the glare range and of passing a high percentage of light striking said surface at lower angles inside from the glare range, and the lower surface of said panel being prismatic along said body.

2. An article of manufacture which comprises, a panel of light-transmitting material having a pair of upper and lower opposed major surfaces whose upper surface is adapted to receive light and whose lower surface is adapted to emit useful light therefrom, said panel having a body defining a lens for light transmitted from an overhead source, said body having a substantial uniform dispersion of about microscopic-size light-absorbing particles therein having the characteristic of reflecting a greater percentage of light striking the upper surface of said panel at a relatively high angular relation to the nadir within the glare range and of passing a high percentage of light striking said surface at lower angular relation to the nadir inside from the glare range, the lower surface of said panel being prismatic along said body, a relatively thin film-like light-transmitting member having opposed upper and lower major surfaces whose upper surface is adapted to directly receive light from the overhead source and whose lower surface is positioned to transmit light therefrom to the upper surface of said panel, said film-like member being bonded along its lower surface to the upper surface of said panel, and said film-like member having a body provided with a plurality of spaced-apart air-bubble-containing portions therein that are flattened in a direction generally parallel to the opposed surfaces of said member to selectively reflect a large percentage of light from the light source of a high angular relation to the nadir and reflect a lesser percentage of light from the source of a lower angular relation to the nadir.

3. An article of manufacture as defined in claim 2 wherein said panel is of a transparent material of the class consisting of polystyrene and acrylic resins, said film-like member is of polystyrene resin material and has a thickness of about 2 mil, and said light-absorbing particles of the body of said panel are of carbon black material.

4. An article of manufacture which comprises, a panel of light-transmitting material having a pair of upper and lower opposed major surfaces whose upper surface is substantially planar and is adapted to receive light and whose lower surface is of prismatic configuration therealong and is adapted to emit useful light therefrom, said panel having a body defining a lens for light transmitted from an overhead source and having a substantially uniform dispersion of microscopic-size light-absorbing particles therein that have the characteristic of reflecting a greater percentage of light striking the upper surface of said panel at a relatively high angular relation to the nadir within the glare range and of passing a high percentage of light striking said surface at a lower angular relation to the nadir inside from the glare range, a transparent relatively thin film-like member having substantially planar opposed upper and lower major surfaces whose upper surface is adapted to directly receive light from the overhead source and whose lower surface is positioned to transmit light therefrom to the upper surface of said panel, said film-like member being bonded along its lower surface to the upper surface of said panel, and said film-like member having a body providing a plurality of spaced-apart air-bubble-containing portions therein and therealong that are flattened in a direction generally parallel to the opposed surfaces of said member to selectively reflect a large percentage of light from the light source of a high angular relation to the nadir and reflect a lesser percentage of light from the source of a lower angular relation to the nadir.

5. An article of manufacture as defined in claim 4 wherein, said panel is of a transparent material of the class consisting of polystyrene and acrylic resins, said film-like member is of polystyrene resin material and has a thickness of about 2 mil, said light-absorbing particles of the body of said panel are of carbon black material, and said panel and film-like member have a composite construction that is characterized by its ability to emit light supplied from the source between zero to 30° to the nadir of about 180 foot lamberts greater than can be accomplished by directly supplying the light from the source to said panel.

References Cited by the Examiner

UNITED STATES PATENTS

| | | | |
|---|---|---|---|
| 2,072,105 | 3/1937 | Fischer | 156—244 |
| 2,318,716 | 5/1943 | Rolph | 240—106.1 |
| 2,474,317 | 6/1949 | McPhail | 240—106 |
| 2,601,127 | 6/1952 | Rosenstein | 88—60 |
| 2,648,763 | 8/1953 | Rolph | 88—60 |
| 2,745,001 | 5/1956 | Guth | 240—78 |
| 2,758,200 | 8/1956 | Franck | 240—106 |
| 2,818,500 | 12/1957 | Franck | 240—106 |
| 2,985,556 | 5/1961 | Rowland | 156—244 |
| 2,993,409 | 7/1961 | Boyd | 88—60 |
| 3,001,062 | 9/1961 | Winkler et al. | 240—106 |
| 3,024,701 | 3/1962 | Marks et al. | 88—60 |
| 3,025,198 | 3/1962 | Dunn | 88—60 |
| 3,069,301 | 12/1962 | Buckley et al. | |

FOREIGN PATENTS 647,651   8/1962   Canada.

NORTON ANSHER, *Primary Examiner.*

EMIL G. ANDERSON, *Examiner.*